(12) United States Patent
Randlov (10) Patent No.: US 10,674,813 B2
(45) Date of Patent: Jun. 9, 2020

(54) SUPPORTING FRAME FOR A PIECE OF FURNITURE (71) Applicant: LINAK A/S, Nordborg (DK)

(72) Inventor: Michael Randlov, Vojens (DK)

(73) Assignee: LINAK A/S, Aalborg (DK)

( * ) Notice: Subject to any disclaimer, the term of this patent is extended or adjusted under 35 U.S.C. 154(b) by 120 days.

(21) Appl. No.: 15/312,975

(22) PCT Filed: May 26, 2015

(86) PCT No.: PCT/DK2015/000020
§ 371 (c)(1),
(2) Date: Nov. 21, 2016

(87) PCT Pub. No.: WO2015/180723
PCT Pub. Date: Dec. 3, 2015

(65) Prior Publication Data
US 2017/0135466 A1 May 18, 2017

(30) Foreign Application Priority Data

May 26, 2014 (DK) .................. 2014 00284
Mar. 20, 2015 (DK) .................. 2015 00173

(51) Int. Cl.
F16M 11/26 (2006.01)
A47B 9/20 (2006.01)
(Continued)

(52) U.S. Cl.
CPC .................. A47B 9/20 (2013.01); A47B 9/04 (2013.01); A47B 13/02 (2013.01); A47B 13/06 (2013.01);
(Continued)

(58) Field of Classification Search
USPC ......... 248/121, 125.8, 150, 151, 154, 354.1, 248/354.3; 108/97, 98, 192, 20, 147,
(Continued)

(56) References Cited

U.S. PATENT DOCUMENTS 5,121,697 A * 6/1992 Baum .................. A47B 3/0803
108/124
5,232,303 A * 8/1993 Rubner ................ A47B 13/021
248/188

(Continued)

FOREIGN PATENT DOCUMENTS

DE 10019292 A1 10/2001
WO 2010036174 A1 4/2010

OTHER PUBLICATIONS

International Search Report and Written Opinion for corresponding Patent Application No. PCT/DK2015/000020 dated Sep. 15, 2015.

Primary Examiner — Alfred J Wujciak
(74) Attorney, Agent, or Firm — Renner Otto Boisselle and Sklar LLP (57) ABSTRACT The invention relates to a supporting frame with a lifting column (59) comprising telescopically arranged profiles with an upper and lower end, said upper end having a housing (60) secured thereto, and a base unit (61,62,63) with a compartment at least for partial reception of the lifting column housing (60) and a locking element (75), which when placed in a locked position exerts a squeezing force between the base unit (61,62) and the housing (60) of the lifting column (59). Thus, the housing (60) of the lifting column (59) is positioned and fixed in the base unit (61,62, 63). The supporting frame further comprises means for retaining the locking element (78) in the locked position.

19 Claims, 10 Drawing Sheets (51) Int. Cl.
    *A47B 9/04*     (2006.01)
    *A47B 13/06*    (2006.01)
    *A47B 13/02*    (2006.01)

(52) U.S. Cl.
    CPC . *A47B 2013/022* (2013.01); *A47B 2200/0054* (2013.01); *A47B 2200/0057* (2013.01); *A47B 2200/0059* (2013.01); *A47B 2200/0061* (2013.01); *A47B 2230/07* (2013.01); *F16M 11/26* (2013.01)

(58) Field of Classification Search
    USPC ................................... 108/147.19; 403/377
    See application file for complete search history.

(56) References Cited

U.S. PATENT DOCUMENTS

| | | | | |
|---|---|---|---|---|
| 7,063,311 | B1* | 6/2006 | Ascolese | B25H 1/18 |
| | | | | 269/69 |
| 10,004,326 | B2* | 6/2018 | Randlov | A47B 9/20 |
| 2012/0298812 | A1* | 11/2012 | Costarella | F16M 11/16 |
| | | | | 248/121 |
| 2012/0304900 | A1* | 12/2012 | Henriott | A47B 13/06 |
| | | | | 108/91 |
| 2013/0152849 | A1* | 6/2013 | Yang | A63F 11/0051 |
| | | | | 116/223 |
| 2014/0367538 | A1* | 12/2014 | Widholzer | A47B 9/20 |
| | | | | 248/188.1 |

* cited by examiner

SUPPORTING FRAME FOR A PIECE OF FURNITURE

This application is a national phase of International Application No. PCT/DK2015/000020 filed May 26, 2015 and published in the English language, which claims priority to Denmark Application Nos. PA 2014 00284 filed May 26, 2014 and PA 2015 00173 filed Mar. 20, 2015, which are all hereby incorporated herein by reference in their entirety.

The present invention relates to a supporting frame for a piece of furniture with a lifting column comprising at least one profile having an upper and lower end, said upper end having a housing secured thereto.

Lifting columns comprising a telescopic guide and a box-shaped housing for height-adjustable tables were developed in the late 1990s, where the telescopic guide has the appearance of a table leg. The box-shaped housing, usually rectangular, contains an electric motor, transmission and various electronics. An example of such a lifting column is shown in FIG. 1 of WO 2004/100632 A1 to LINAK A/S. A different type of lifting column is described in WO 03/003876 A1 to LINAK A/S, where the entire drive unit, i.e. electric motor, transmission and various electronics, is integrated in the telescopic guide.

For a supporting frame comprising the type of lifting columns with a box-shaped housing, the lifting columns are typically secured to two longitudinal members by means of screws into the box-shaped housing. The longitudinal members are usually placed in parallel having a mutual distance between them corresponding to the width of the box-shaped housing. To each end of the longitudinal members a cross member is secured. A lifting column is mounted at each end in that the box-shaped housing is positioned between the longitudinal members and with one end up against the respective cross member. The lifting column is secured by means of screws through the two longitudinal members and the cross member into the sides and one of the ends of the box-shaped housing, respectively. An example of such a table is shown in FIG. 1 of U.S. Pat. No. 6,509,705 B2 to LINAK A/S. The securing is relatively troublesome and time-consuming. As it appears, the lifting columns with the box-shaped are mounted in the longitudinal direction of the table.

EP 2 160 958 A1 to LINAK A/S discloses a solution for mounting of the lifting columns, where they with the box-shaped housing face across the table. FIGS. 6-9 of EP 2 160 958 A1 disclose a solution with a separate mounting bracket based on a U-shaped profile, where the lifting column with the box-shaped housing fits between the sides of the U-shaped profile. In FIGS. 8-9 of EP 2 160 958 A1 the mounting bracket is shaped as a box with slanting sides and ends and with a hole corresponding to the box-shaped housing on the lifting column. Thus, the box-shaped housing of the lifting column can be received and secured in the mounting bracket. The advantage of these two solutions is that the common lifting columns may be used. By this mounting the otherwise necessary longitudinal and cross members can be avoided and still achieve a good stability in the transverse direction of the table. The solution outlined in FIG. 5 of EP 2 160 958 A1 requires a special design of the housing with tongues for securing protruding from the upper side of the housing and further the guide is facing in the direction across, consequently resulting in a completely different design of the lifting column.

From DK 176 256 B1 to Duba-B8 A/S a coupling system based on a guideway and a rotatable eccentric arrangement for coupling of furniture and furniture parts is known. The coupling system is used for coupling of furniture and furniture parts, where a flat unit is positioned in the guideway and is locked with the eccentric arrangement in each of the two pieces of furniture or furniture parts abutting each other. FIG. 6 of DK 176 256 B1 shows, how a table leg in a corresponding manner can be secured in that the upper end of the table leg is equipped with a flat unit corresponding to the unit used for coupling of the tables. It is understood that in this case the height-adjustable table legs do not require a particular stable securing. A corresponding coupling system for tables based on a guideway and a rotatable eccentric arrangement is described in DE 10 2009 036 204 A1 to KessebOhmer.

The purpose of the invention is to provide a supporting frame for an adjustable piece of furniture with a simple and non-time-consuming securing of the electrically driven lifting columns.

This is achieved according to the invention by designing the supporting frame with a base unit having a compartment at least for partial reception of the housing of the lifting column, and a locking element, which when placed in a locked position exerts a squeezing force between the base unit and the housing of the lifting column. Thus, the housing of the lifting column is positioned and fixed in the base unit. The supporting frame further comprises means for retaining the locking element in the locked position. Hereby, a supporting frame is achieved, which is simple and easy to assemble and mount without the use of tools.

In an embodiment the base unit of the supporting frame comprises a guide, which depending on the construction of the supporting frame functions as a guide for correct mounting of the lifting column, including fixation of this to the base unit.

In an embodiment the supporting frame comprises a clamp with guides for cooperation with the guide on the base unit. In this embodiment the housing of the lifting column is placed between the base unit and the clamp. When the locking element is in the locked position, this will, in cooperation with the base unit and the clamp, exert a squeezing force on the housing of the lifting column. Thus the housing of the lifting column is fixated in the base unit. In an embodiment the locking element can be inserted into a opening in the clamp and be retained in the locked position.

In an embodiment the base unit has a U-shaped cross section with two parallel side walls with a mutual distance between them corresponding to the width of the lifting column housing and where the guides of the base unit are constructed in the parallel side walls. By having a minimum clearance between the side walls of the base unit and the lifting column housing an improved fixation of the housing to the base unit is achieved.

In an embodiment the clamp has a U-shaped cross section with two parallel side walls, in which the guides of the clamp are located. This embodiment further contributes to an improved fixation of the housing in the base unit.

In an embodiment the base unit comprises a transverse wall connecting the two parallel side walls of the base unit, against said cross wall a rear end of the lifting column housing can rest. The fixation is improved in that yet another surface of the housing is fixed to the base unit.

In an embodiment the cross section of the base unit is shaped like a hollow profile in which the lifting column housing can be arranged by sliding it in from an open end. Expediently, the hollow profile of the base unit comprises a recess for the telescopically arranged profiles of the lifting column, by which the entire housing of the lifting column can be received in the base unit. For fixation of the lifting column in the base unit the hollow profile of the base unit can comprise a opening into which the locking element is inserted and retained in a locked position. For improving the fixation of the lifting column the supporting frame can comprise a transverse wall, which at least partially closes one end of the hollow profile of the base unit. Thus, a rear end of the lifting column housing can rest against the transverse wall.

In an embodiment the transverse wall of the base unit and the end of the lifting column housing resting against the transverse wall can be furnished with mutually functioning means for retaining the lifting column housing in the base unit. Thus, the fixation can be improved.

In an embodiment the transverse wall constitutes a part of a cross member, which is likewise comprised by the supporting frame.

In an embodiment the housing of the lifting column comprises a guide for cooperation with the guide on the base unit. Thus, the lifting column can be fixed to the base unit without using a clamp. For fixation of the lifting column the base unit comprises an opening into which the locking element can be inserted and retained in the locked position.

In an embodiment the locking element comprises a front surface for engagement with the lifting column housing. The plane of action between the locking element and the lifting column housing ensures a transmission of force when the locking block is brought into a locked position.

In another embodiment the locking element comprises a projecting edge for engagement with an edge of the opening in the base unit or the clamp, around which engagement the locking element in a rotatable manner can be pressed into this opening. Thus, is ensured that the locking block is placed correctly in the opening as the locking element cannot be brought into its locked position without the engagement. The rotatable movement makes it easier to bring the locking element into its locked position.

In an embodiment the locking element comprises a snap lock prepared for engagement with the opening in the base unit or the clamp. When the snap lock is in engagement with this opening, the locking element is retained in its locked position.

In an embodiment of the supporting frame the lifting column is of the type where an electric motor and a transmission for bringing about the movement of the lifting column are arranged in the housing of the lifting column.

In another embodiment the supporting frame is of the type where an electric motor and a transmission for bringing about the movement of the lifting column are arranged in one of the telescopically arranged profiles and where the housing as a separate unit is mounted on an end of one of the telescopically arranged profiles. The housing thus functions as an adapter, by which it is possible to use this type of lifting column for the supporting frame.

The invention will be explained more fully below under reference to the accompanying drawings. For the sake of the clarity of the drawings it should be noted that the shown elements often are depicted as cut off. A dotted line through the element concerned shows where it has been shortened. In the drawings.

Figure 1:
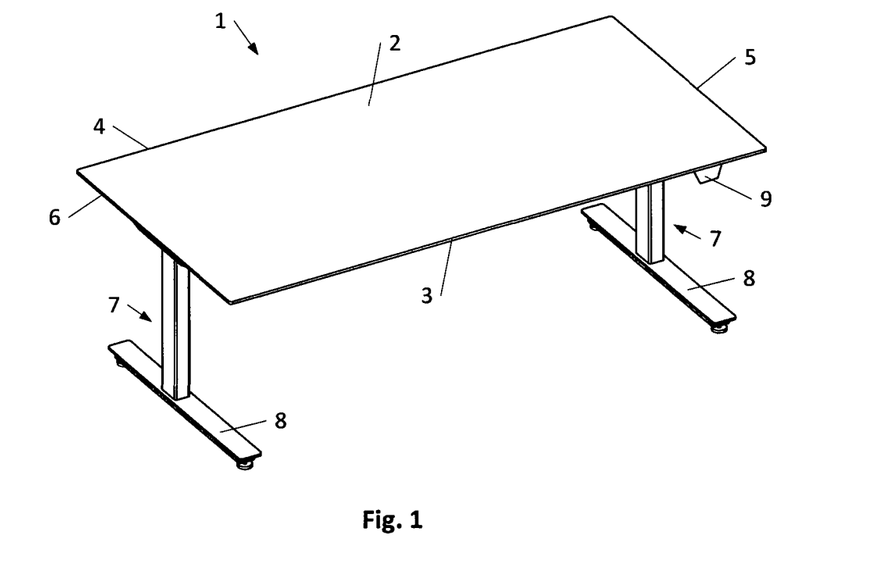
FIG. 1 is a height-adjustable table equipped with lifting columns.

The height-adjustable table 1 shown in FIG. 1 comprises a table top 2 having a front side 3 at which a user is expected to be situated, a rear side 4, a right side 5 and a left side 6. At the right side 5 and left side 6, respectively of the table top 2 there is a telescopic lifting column 7. The lower end of the lifting columns 7 is mounted with an elongated foot 8, which extends across the table. The telescopic lifting columns 7 can be adjusted in their longitudinal direction by means of an operating unit 9, by which the height of the table top 2 can be adjusted. The two lifting columns are connected to a control box comprising a controller. Further, the control box is connected to the operating unit 9 from which the height of the table top can be adjusted.

Figure 2:
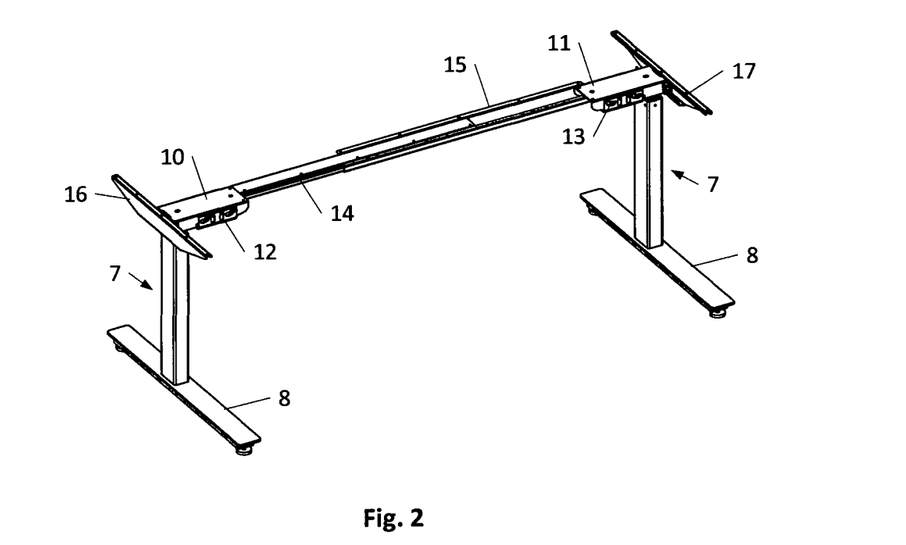
FIG. 2 is a supporting frame in a first embodiment for the height-adjustable table shown in FIG. 1.

FIG. 2 shows a first embodiment of a supporting frame for the height-adjustable table shown in FIG. 1. The supporting frame further comprises two base units 10,11 and two clamps 12,13 between which the lifting columns are mounted. The two base units 10,11 are connected to the two telescopically arranged longitudinal members 14,15. Further, each of the base units has a cross member 16,17 secured thereto.

Figure 3:
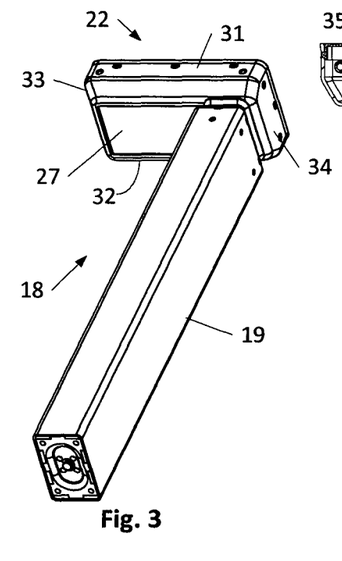
FIG. 3 is a perspective view of a lifting column.
Figure 4:
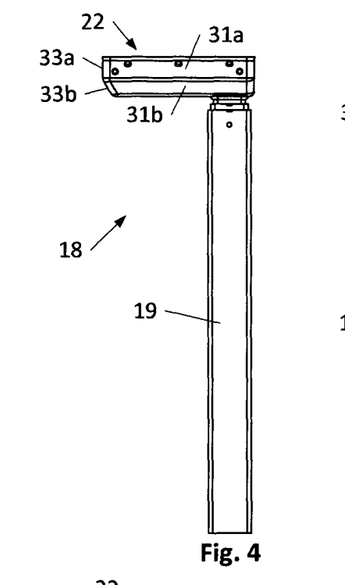
FIG. 4 is a lifting column in a retracted position seen from one side.
Figure 5:
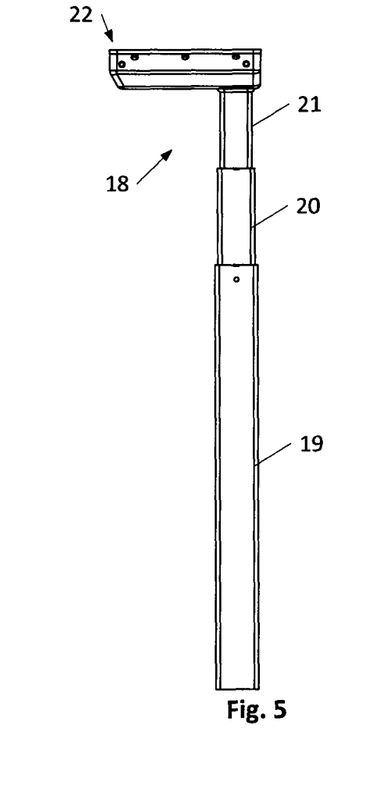
FIG. 5 is a lifting column in a partially extended position seen from one side.
Figure 6:
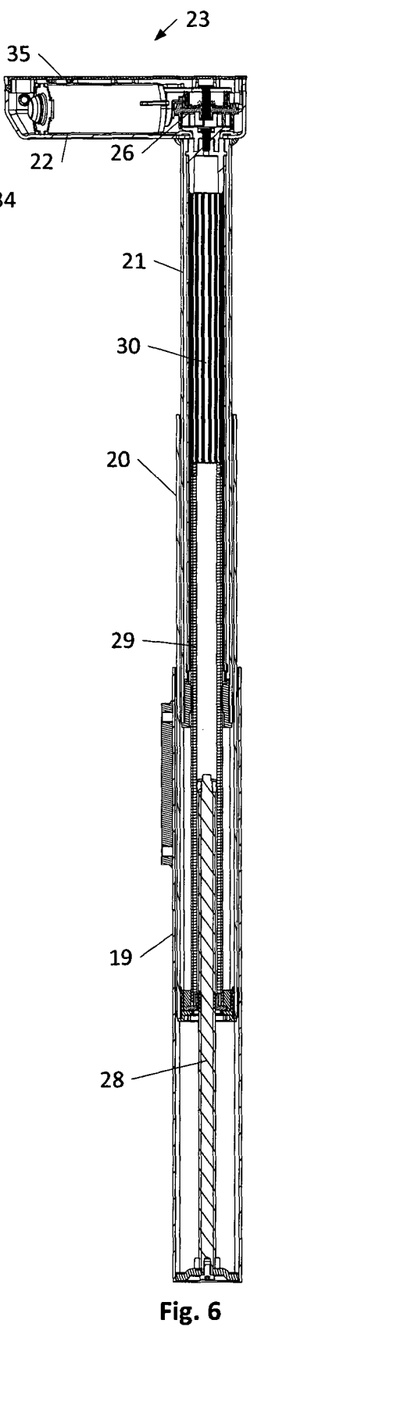
FIG. 6 is a section through the lifting column shown in FIG. 5.

FIGS. 3 and 4 illustrate a lifting column 18 shown in a perspective view and from the side, respectively. FIG. 5 shows the same lifting column 18 in a partially extended position. The lifting column comprises a guide consisting of three telescopically arranged rectangular profiles 19,20,21. Further, the lifting column 18 comprises a box-shaped housing 22. For bringing about the movement of the lifting column 18 this comprises a linear actuator, see FIG. 6. The linear actuator consists of a motor unit 23 arranged in the box-shaped housing 22 (see FIG. 6) and a linear moveable activation element arranged in the hollow of the rectangular profiles 19,20,21. The motor unit 23 comprises a reversible electric motor 25 and a transmission 26. The linear moveable activation element is constructed as a spindle unit connected to the transmission 26 of the motor unit through a hole in the bottom portion 27 of the motor housing. The spindle unit consists of a solid spindle 28, a hollow spindle 29 and a tube 30 with a spindle nut at the top. The housing 22 consists of a rectangular steel box having two parallel side portions 31,32, a front end 33 and a rear end 34, which are parallel, as well as a bottom portion 27. The top of the housing 22 can be closed by means of a cover 35. The external surfaces on the front end 33 and the two side portions 31,32 comprise two surfaces. A first plane surface 31a,33a (see FIG. 4), which extends from the top of the housing towards the bottom portion 27 of the motor housing and which is parallel to the longitudinal axis of the rectangular profiles 19,20,21, and in continuation thereof a second plane surface 31b, 33b, which forms an acute angle with the longitudinal axis of the rectangular profiles 19,20,21 and connects with the bottom portion 27 of the motor housing. Consequently, the area of the top of the motor housing is larger than the area of the bottom portion 27. The transition from the first plane surface to the second plane surface and further from the second plane surface to the bottom portion 27 is rounded off.

Figures 7, 8:
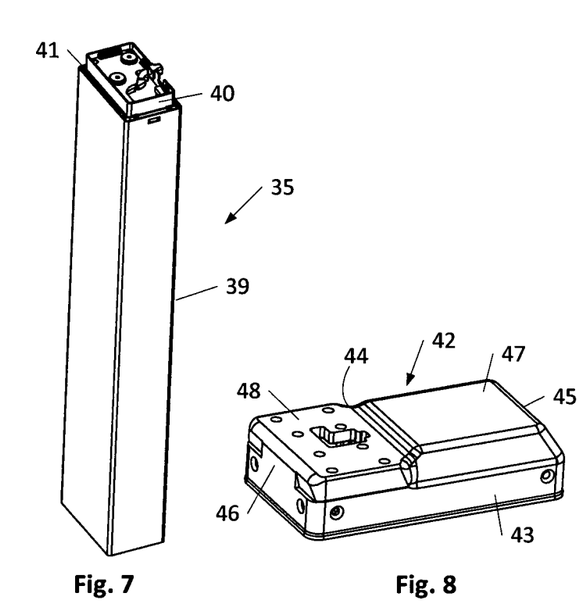
FIG. 7 is a perspective view of a lifting column, where the drive unit is arranged in the telescopically arranged profiles.
FIG. 8 is a housing as a separate unit for the lifting column in FIG. 7.
Figure 9:
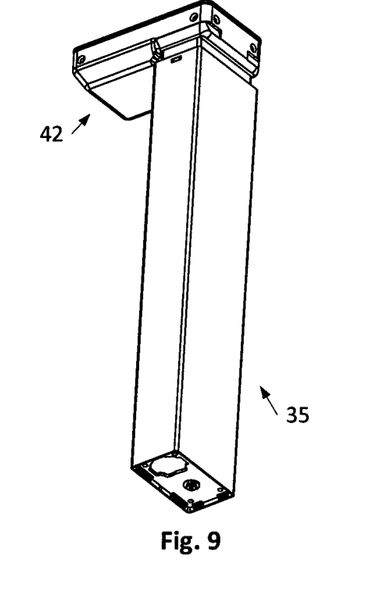
FIG. 9 is the lifting column in FIG. 7 mounted with the housing in FIG. 8.

FIG. 7 shows a perspective view of a different type of lifting column 35 without housing, a so-called in-line lifting column, where the entire drive unit, including electric motor 37 and transmission 38, is arranged in the telescopically arranged profiles 39,40,41. FIG. 8 shows a housing 42 as a separate unit intended for mounting at the topmost end of the lifting column 35, more precisely for mounting in the profile 41. The housing 42 consists of a rectangular steel box with two parallel side portions 43,44, a front end 45 and a rear end 46, which are parallel, as well as a bottom portion 47. The top of the housing 42 can be closed by means of a cover. Further, the housing comprises a mounting surface 48 for mounting of a lifting column 35 of the type shown in FIG. 7. FIG. 9 shows a perspective view of the lifting column 35 mounted with the housing 42.

Figure 10:
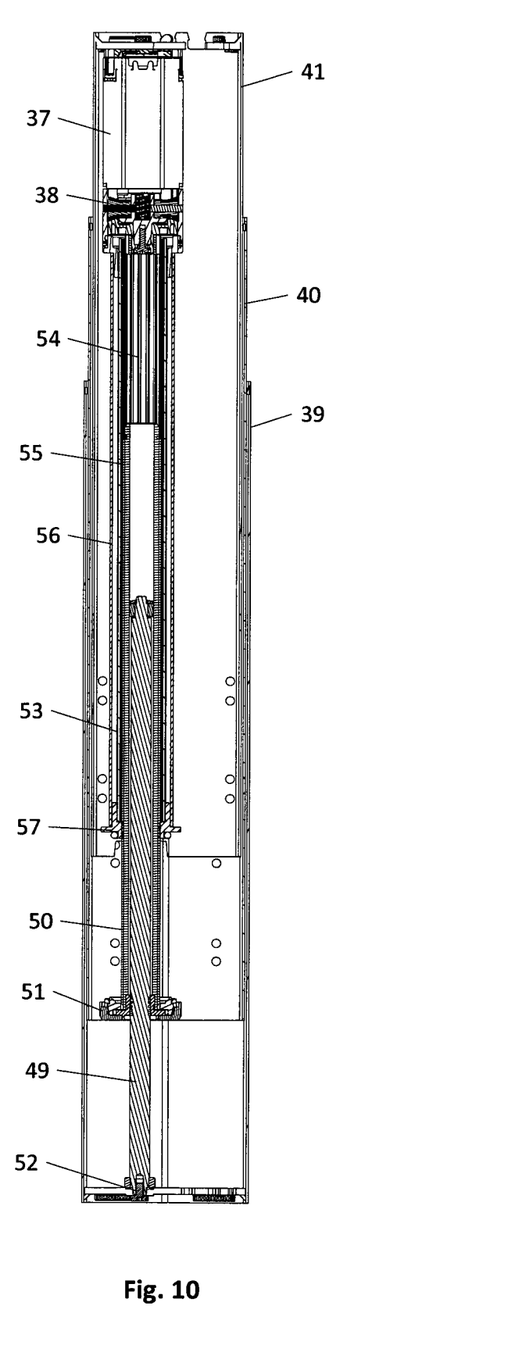
FIG. 10 is a section through the lifting column shown in FIG. 7.

The drive unit in FIG. 10 is constructed as a linear actuator for bringing about the telescopic movement of the lifting column 35. The linear actuator comprises a spindle unit consisting of a solid spindle 49 and a hollow spindle 50, both with external threads. At the lower end of the hollow spindle a spindle nut 51 for the solid spindle 49 is secured, said spindle nut 51 is constructed as a bushing with internal threads. By rotating the hollow spindle 50 the spindle nut 51 will screw itself up along the solid spindle 49, as this is secured against rotation at its free end 52. The hollow spindle 50 is surrounded by a drive tube 53, which on the internal side is equipped with a number of axially running grooves 54. At the uppermost end of the hollow spindle 50 the external side is fitted with a ring 55 having a number of external fins protruding into the grooves 54 on the drive tube 53. Surrounding the drive tube 53 there is a guide tube 56 at the lower end of which, a spindle nut 57 for the hollow spindle 50 is secured. The spindle nut 57 is in the shape of a bushing with internal threads. When the drive tube 53 is rotated, the guide tube 56 will screw itself up along the hollow spindle 50, as the guide tube 56 at its upper end is secured against rotation. As the hollow spindle 50 is driven around this will screw itself synchronously up along the solid spindle 49 as explained above, i.e. the axial movement is the joint movement of both hollow and solid spindle. The drive tube 53 is driven by an electric motor 37 through a transmission 38. The transmission comprises a worm gear, which through a gear wheel set drives a crown wheel, which drives the drive tube 53.

Figure 11:
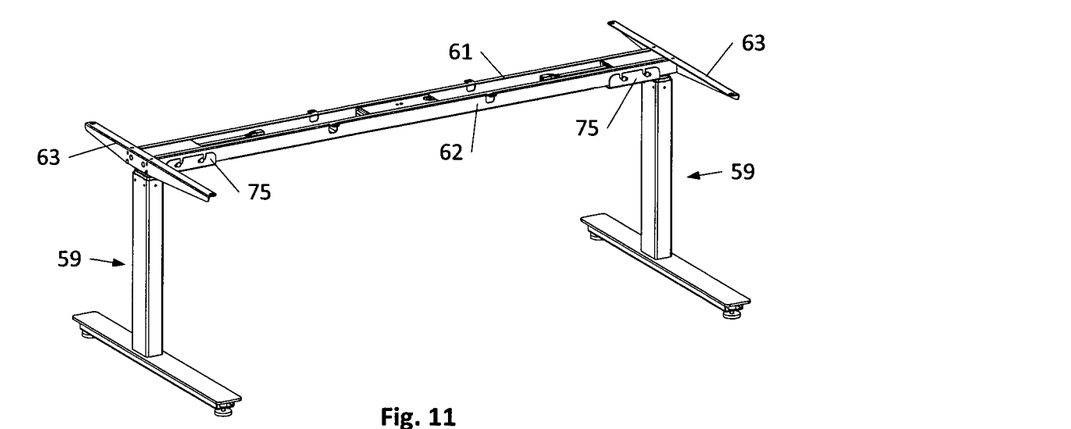
FIG. 11 is a perspective view of a supporting frame in a second embodiment, where a lifting column is mounted in a supporting frame comprising longitudinal members.
Figure 12:
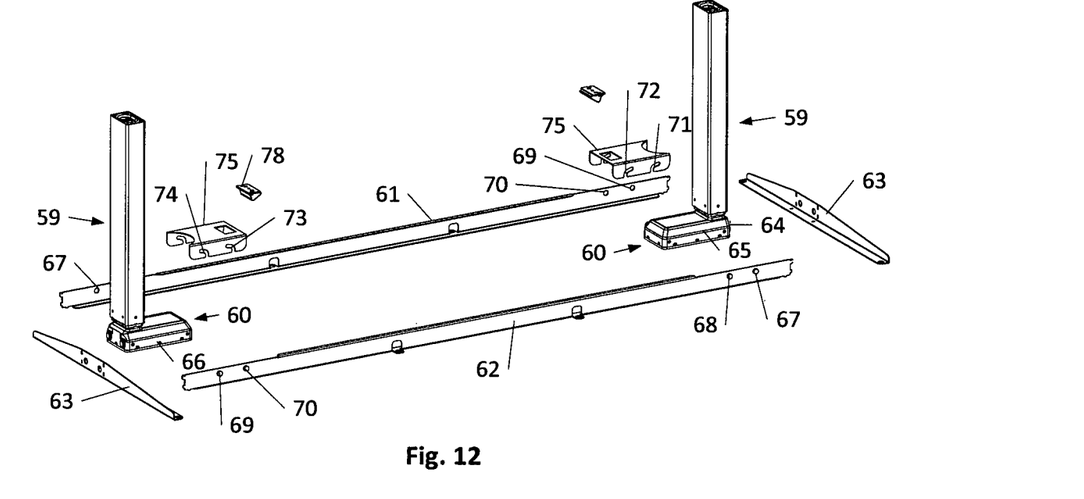
FIG. 12 is an exploded perspective view of the supporting frame of FIG. 11.
Figure 13:
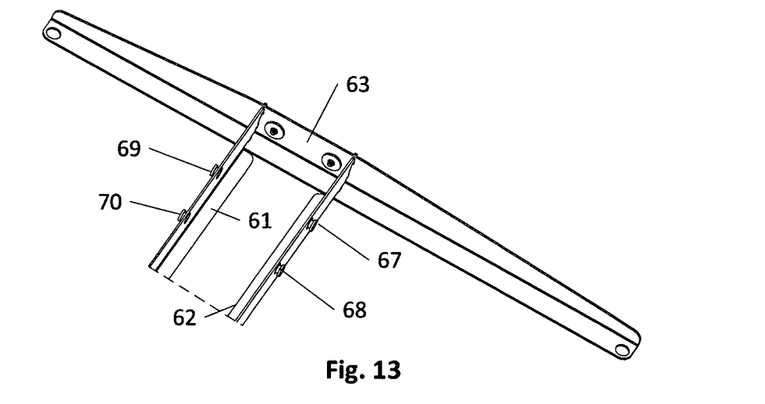
FIG. 13 is a perspective view of a section of the two longitudinal members and a cross member.

FIG. 11 shows a perspective view of a second embodiment of a supporting frame comprising longitudinal and cross members. A lifting column 59 is with its housing 60 located in a base unit, which in this second embodiment is constituted by two parallel longitudinal members 61,62 with an L-shaped cross section and a cross member 63 mounted at the end of the two longitudinal members 61,62. The two longitudinal members 61,62 are located with a distance corresponding to the width of the lifting column housing 60. More specifically, the housing 60 of the lifting column is positioned such that the rear end 64 of the housing 60 rests against the cross member 63 and the parallel side portions 65,66 of the housing each rests against the respective profiles of the longitudinal member 61,62. In the area of or near the lifting column housing each of the longitudinal members 61,62 comprises two pins 67,68;69,70 prepared for engagement with a guide 71,72;73,74 on a clamp 75, which is positioned over a part of the bottom portion 79 (see FIG. 1) of the lifting column housing 60. The clamp 75 has a U-shaped cross section and the guides 71,72;73,74 are placed in pairs on each of the two parallel sides in the U-shape of the clamp 75. The guides 71,72;73,74 have a curved course and are open towards the top of the parallel sides in the U-shape of the clamp 75. The bottom of the U-shape of the clamp 75 comprises a rectangular opening 82 (see FIG. 15) in which a locking element in the shape of a locking block 78 is secured. The clamp 75 and the locking block 78 cooperates in pushing the rear end 64 of the lifting column housing 60 against the cross member 63 and the top of the lifting column housing against the longitudinal members 61,62.

Figures 14, 15, 16:
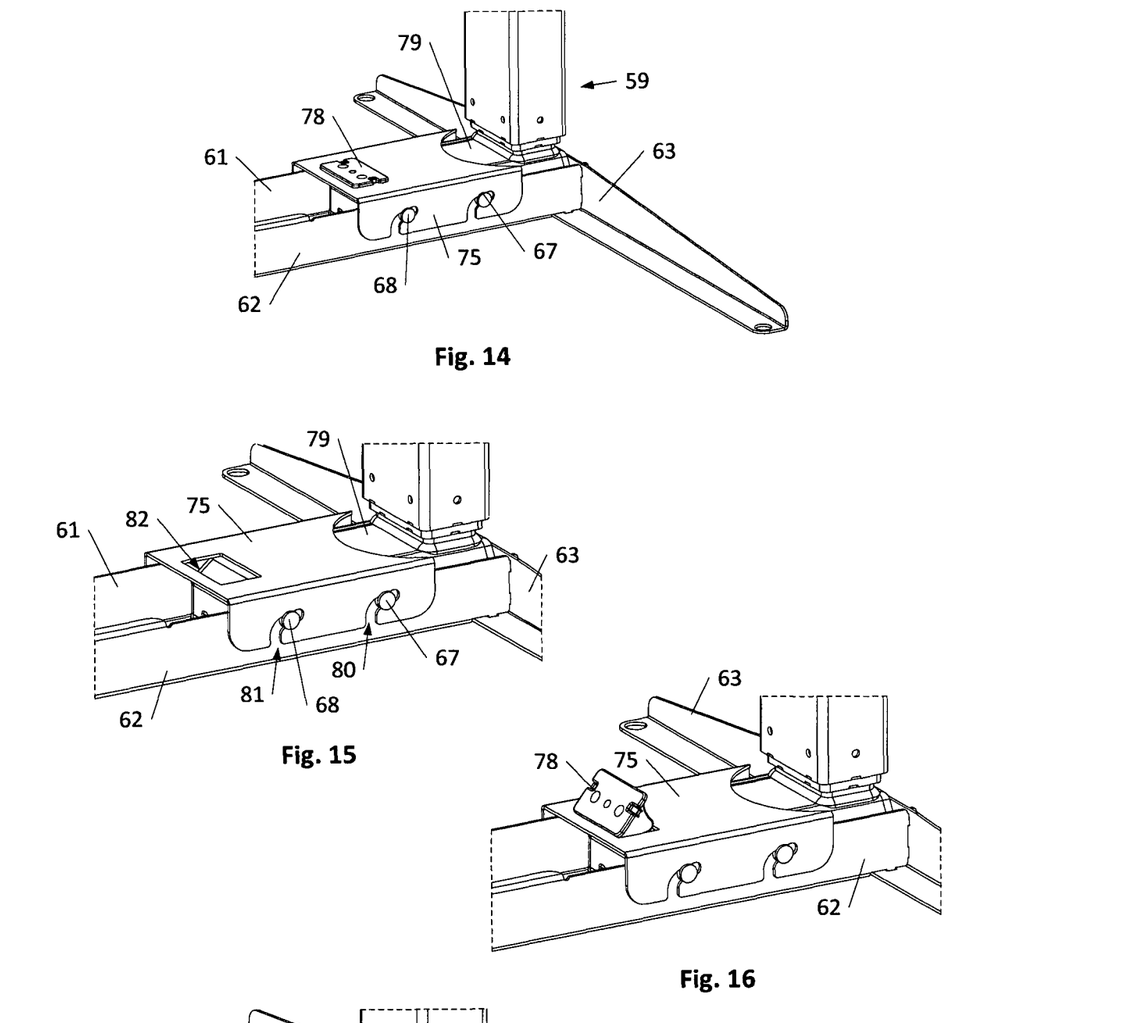
FIG. 14 is a perspective view of a second section of the lifting column of the supporting frame mounted in the longitudinal members.
FIGS. 15-19 are a section in a perspective view of a series of figures showing how one of the lifting columns of the supporting frame is mounted between the longitudinal members.
Figure 17:
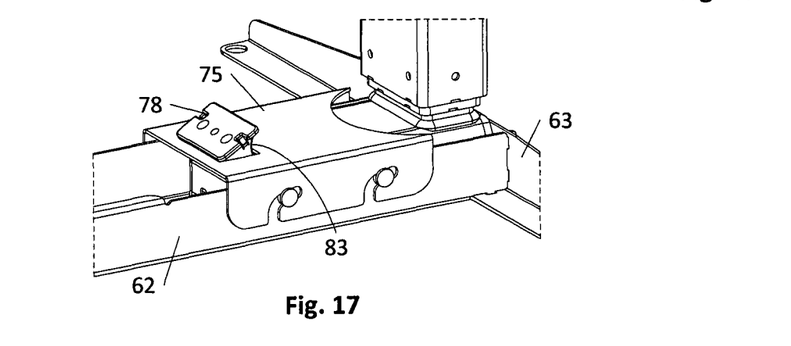
Figure 18:
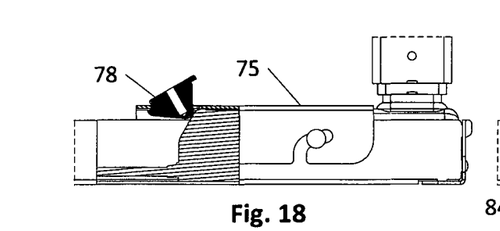
Figure 19:
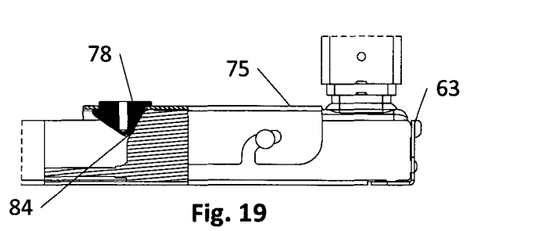

With reference to FIGS. 14-19 it is described in the following how the lifting column 59 is secured to the longitudinal member 61,62 and the cross member 63. In FIG. 15 the housing 60 of the lifting column is positioned such that the rear end 64 of the housing 60 rests against the cross member 63 and such that the parallel side portions 65,66 of the housing 60 each rests against the inner side of the longitudinal members 61,62. The clamp 75 with the U-shaped cross section is placed such that the inner side of the bottom of the U-shape rests against a part of the bottom portion 79 of the lifting column housing. Further, the inner side of the parallel sides of the clamp rests against the outer side of the longitudinal members 61,62. The guides 71,72 in the parallel sides of the clamp 75 are in engagement with the pins 67,68. In FIG. 16 one end of the locking block is fixed in the side of the rectangular opening 82 facing furthest away from the telescopically arranged profiles of the lifting column. In FIG. 17 the locking block 78 is tilted partially into the opening 82 in the clamp. In FIG. 18 a similar situation is shown, but in a partial section through the lifting column 59, the clamp 75 and the locking block 78. In FIG. 19, which is a partial section corresponding to FIG. 14, the locking block 78 is pressed all the way into the opening 82. The entire or part of the surface 83 of the locking block rests against the front end 84 of the lifting column housing 60. When the locking block 78 is pressed into the opening 82, the clamp 75 will through the engagement of the pins 67,68 with the guides 80,81, push the rear end of the housing 60 against the cross member 63 and further the top of the housing 60 against the longitudinal members 61,62 in the direction of the horizontal flaps of the L-shaped profile of the longitudinal member 61,62.

Figure 20:
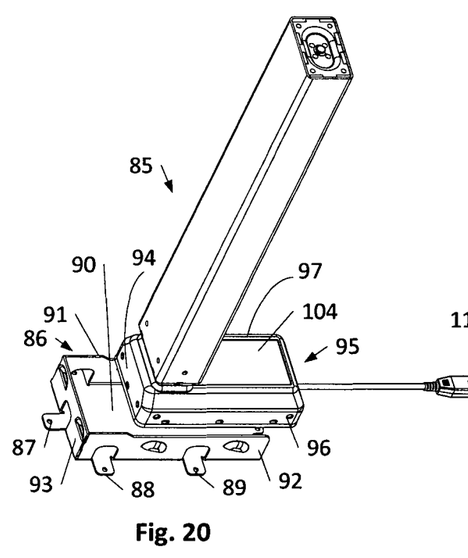
FIGS. 20-28 are a section in a perspective view of a series of figures in a third embodiment of a supporting frame, including how a lifting column is mounted in a base unit.
Figure 21:
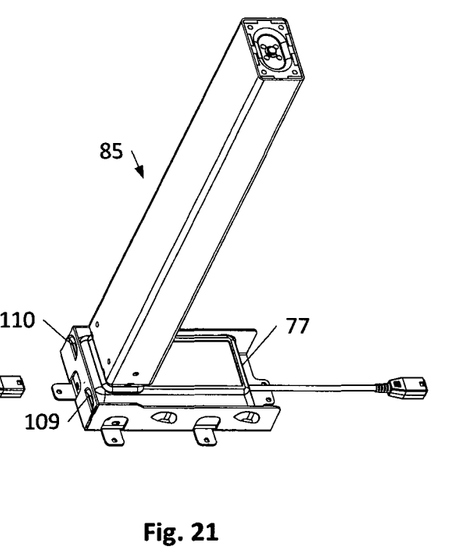

FIGS. 20-28 show a third embodiment of a supporting frame. In this third embodiment no longitudinal members or cross members are used for securing the lifting column 85. Instead the base unit 86 is constructed as a fitting with a number of flaps 87,88,89 for securing the base unit 86 to e.g. the underside of a table top. The base unit 86 is box-shaped and consists of a rectangular bottom 90, two parallel side walls 91,92 and an end wall 93. As shown in FIG. 21 the rear end 94 of the lifting column housing 95 rests against the end wall 93 and each of the parallel side walls 96,97 of the housing 95 rests against the inner side of the two parallel side walls 91,92 of the base unit.

Figure 22:
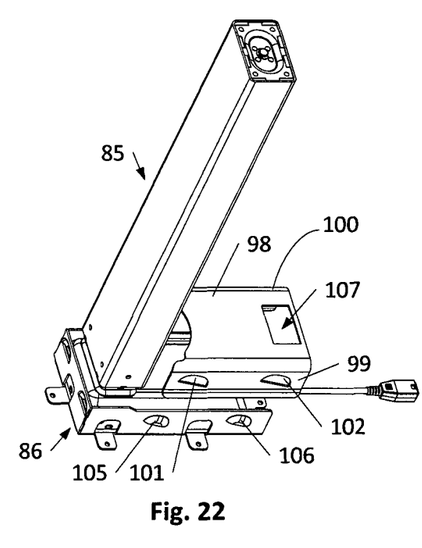
Figure 23:
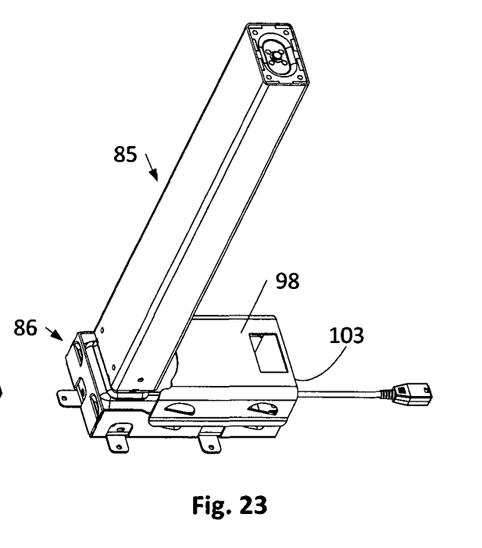
Figure 24:
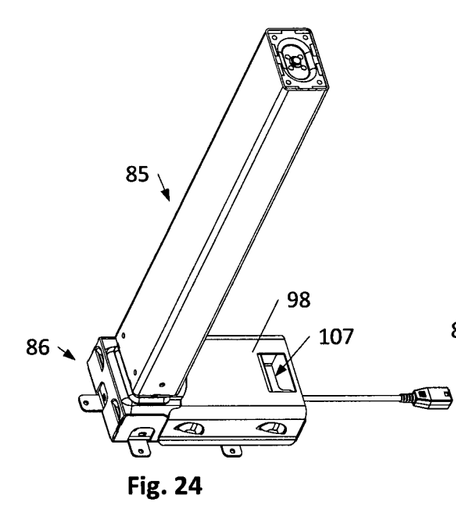

FIGS. 22-24 show how the clamp 98 is fixed to the base unit 86. The clamp 98 has a U-shaped cross section. Each of the two parallel sides 99,100 in the U-shape of the clamp are furnished with two guides constructed as holes 101,102 in the shape of a semicircle. The clamp 98 is positioned such that the inner side of the bottom 103 of the U-shape rests against part of the bottom portion 104 of the lifting column housing 95. Further the inner side of the parallel sides 99,100 of the clamp 98 rests against the outer side of the two parallel side walls 91,92 of the base unit. The two holes in the clamp 98 are in engagement with two pins 105,106 in the shape of an embossment or half punching. It is understood that the clamp 98 and the base unit 86 at the opposite side comprises two holes and two guides, respectively, which in a corresponding manner likewise are in engagement with each other. The bottom 103 on the U-shape of the clamp comprises a rectangular opening 107.

Figure 25:
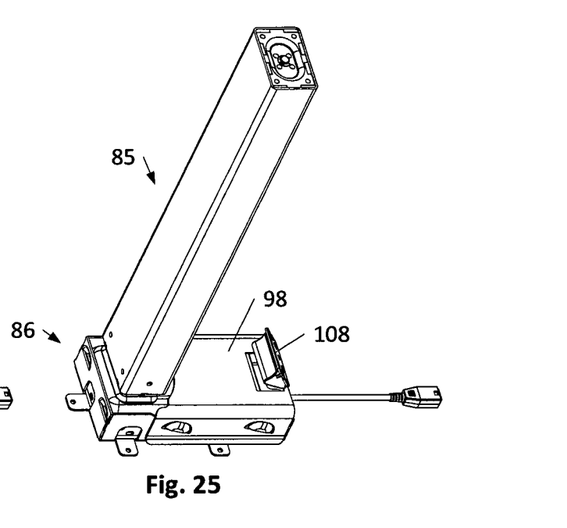
Figure 26:
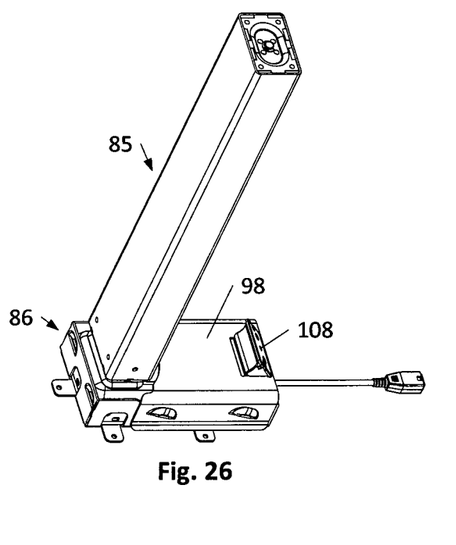
Figure 27:
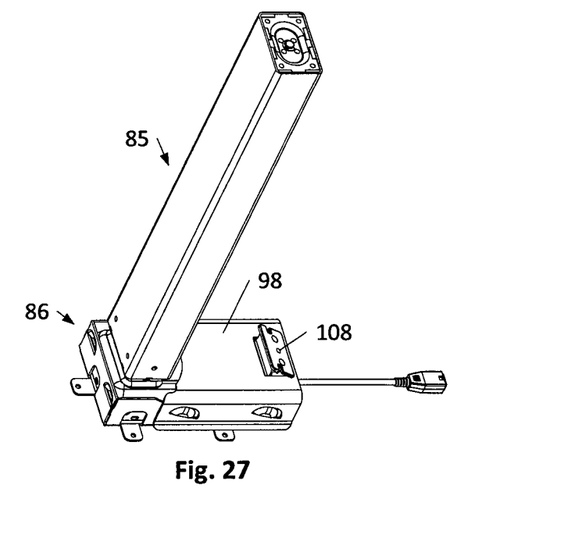

FIGS. 25-28 show how a locking block 108 is secured in the clamp 98. In FIG. 25 one side of the locking block 108 is in engagement with the side of the rectangular opening 107 facing furthest away from the telescopically arranged profiles of the lifting column. In FIGS. 26 and 27 the locking block 108 is tilted partially into the opening 107 of the clamp. Concurrently with the locking block 108 being tilted into the opening 107, the locking block 108 pushes against the front end 77 of the lifting column housing 95. Thus, the rear end 94 of the lifting column housing 95 is pushed against the end wall 93 of the base unit 86. Further, the top of the housing is pushed against the bottom 90 of the base unit, when the clamp is moved in a direction opposite of the telescopically arranged profiles of the lifting column and towards the bottom 90 of the base unit. The direction of movement of the clamp is controlled in that the straight line in the semicircle of the holes 101,102 is in engagement with the guides 105,106 in the base unit 86, which has an acute angle relative to an axis perpendicular to the longitudinal axis of the telescopically arranged profiles of the lifting column.

Figures 28, 29:
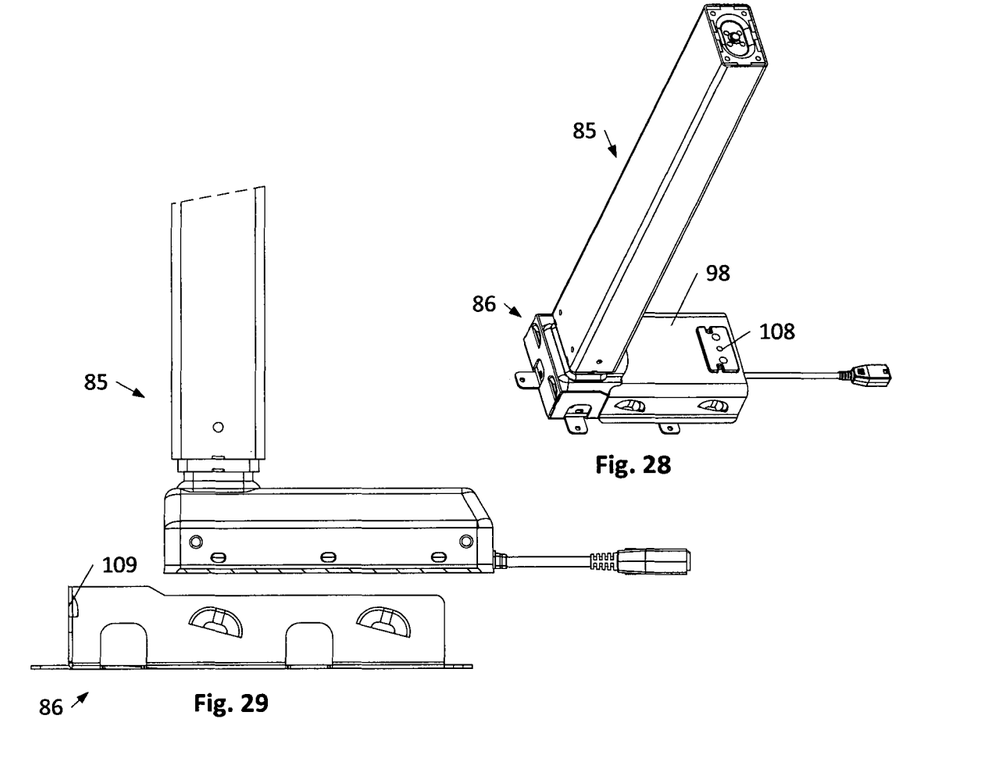
FIG. 29 is FIG. 20 shown from the side with a section through the base unit.
Figures 30, 31:
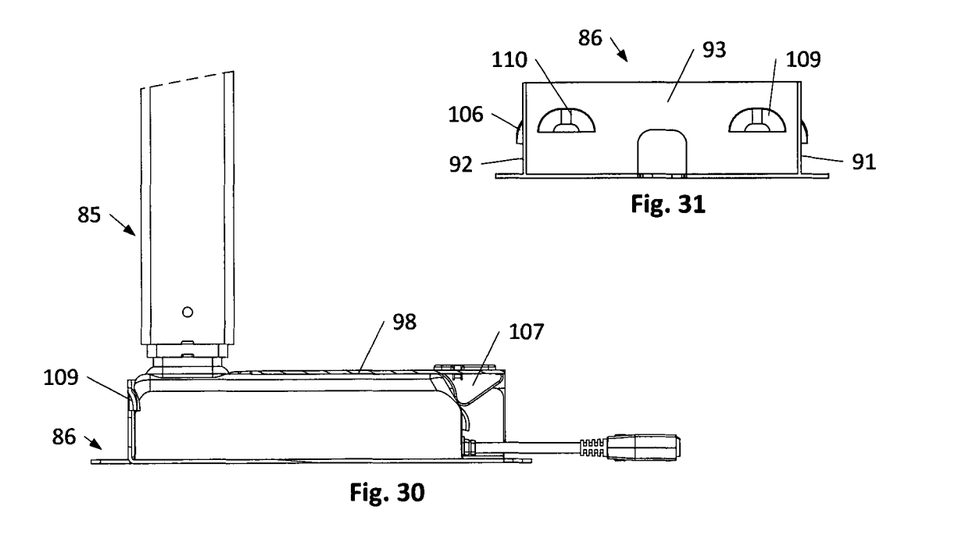
FIG. 30 is FIG. 28 shown from the side with a section through all shown elements.
FIG. 31 is the base unit of the FIGS. 20-30 shown from the side towards the transverse wall.

FIGS. 29 and 30 correspond to FIGS. 20 and 28, respectively seen from one side. In FIG. 29 a section through the base unit 86 is shown and FIG. 30 shows a section through all the shown elements. FIGS. 29 and 30 show a pin 109,110 in the shape of a half punctuation or embossment in the end wall 93 of the base unit. The pin 109 is prepared for engagement with the rear wall 94 of the lifting column housing 95, by which the housing 95 and thus the lifting column 85 is fixed in a direction along the longitudinal axis of the telescopically arranged profiles of the lifting column 85. As shown in e.g. FIG. 21 it is noted that the end wall 93 of the base unit comprises two pins 109,110. FIG. 30 further shows how the locking block 107 is in engagement with the front end 77 of the lifting column housing 95.

FIG. 31 shows the base unit 86 seen from the side towards the end wall 93, which comprises the before mentioned pins 109,110. Further, the guides are shown on both side walls 91,92, of which only the guide 106 is referenced.

Figure 32:
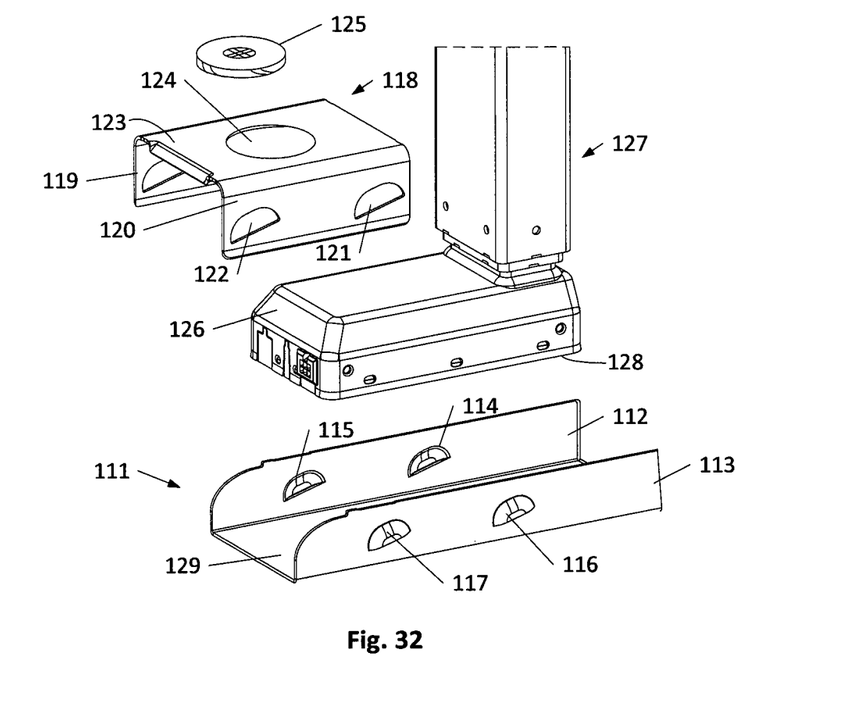
FIG. 32 is an exploded perspective view of a fourth embodiment of the supporting frame.

FIG. 32 schematically shows a fourth embodiment of the supporting frame in exploded perspective, where the base unit 111 has a U-shaped cross section and where the sidewalls 112,113 each comprises two guides 114,115;116,117. On the clamp 118, which also has a U-shaped cross section, the side walls 119,120 likewise each comprises two guides, where only the guides 121,122 on the side wall 120 are referenced. The bottom 123 of the clamp 118 further has an opening 124 in which a locking element in the shape of a rotatable pivot element 125 can be fixed. The housing 126 on the lifting column 127 is placed in the base unit 111 and the clamp 118 is arranged above this, such that the guides 114,115;116,117;121,122 on the base unit 111 and the clamp 118, respectively meshes. Subsequently, the rotatable pivot element 125 is inserted into the opening 124 and is rotated to a locked position by which the top 128 of the lifting column housing 126 is pushed against the bottom 129 of the base unit as the clamp 118 is moved towards the bottom 129 of the base unit. The direction of movement of the clamp 118 is controlled by means of the guides 114,115;116,117;121, 122 in the base unit 111 and the clamp 118, respectively.

Figure 33:
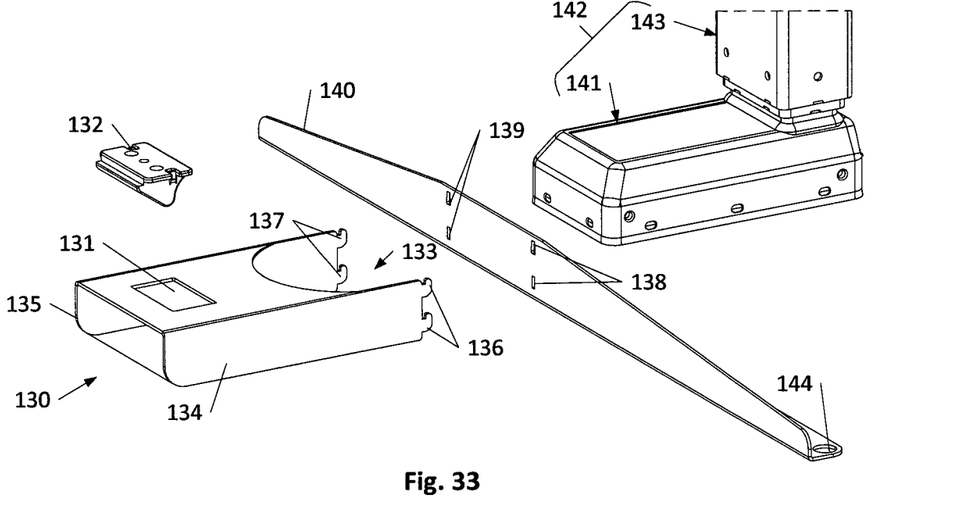
FIG. 33 is an exploded perspective view of a fifth embodiment of the supporting frame.

FIG. 33 schematically shows an exploded perspective view of a fifth embodiment of the supporting frame. Here, the base unit 130 is constructed with a cross section as a rectangular hollow profile. The base unit 130 comprises an opening 131 adapted for a locking element 132. Further the base unit 130 comprises a recess 133, which is open towards one end of the base unit 130. In continuation of the same end of the base unit 130 the side walls 134,135 have a number of flaps 136,137 designed as clasps prepared for engagement with a corresponding number of holes 138,139 on a cross member 140. For assembly of the supporting frame the housing 141 is placed on the lifting column 142 in the base unit 130 such that the telescopically arranged profiles 143 of the lifting column protrude from the recess 133 in the base unit 130. Subsequently, the cross member 140 is secured to the base unit 130 through engagement between the flaps 136,137 and the holes 138,139. Finally, the locking element 132 is inserted into the recess 131 and is pressed into a locked position. The supporting frame can be secured to a table top including through the hole 144 in the cross member 140.

Figure 34:
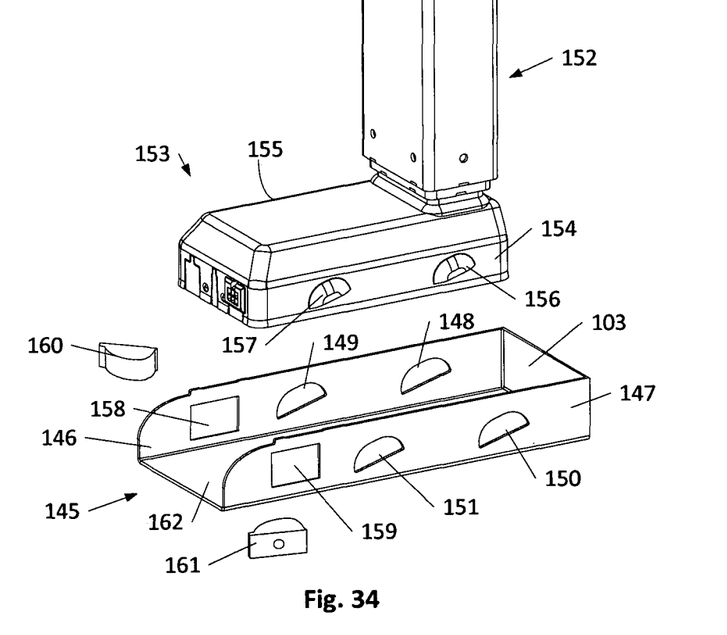
FIG. 34 is an exploded perspective view of a sixth embodiment of the supporting frame.

FIG. 34 schematically shows an exploded perspective view of a sixth embodiment of the supporting frame. The base unit 145 has a U-shaped cross section and the side walls 146,147 each comprises two guides 148,149;150,151. On the lifting column 152 the side walls 154,155 of the housing 153 likewise comprise guides 156,157. It is noted that only the guides 156,157 on the side wall 154 are shown. Corresponding guides can be found on the side wall 155. The guides 156,157 on the side wall 154 are intended for engagement with the guides 150,151 on the side wall 147 of the base unit 145. Each of the side walls 146,147 comprises an opening 158,159 in which a locking element in the shape of a locking block 160,161 can be inserted and wedged.

The housing 153 of the lifting column 152 is positioned in the base unit 145, such that the guides 148,149;150,151; 156,157 on the base unit 145 and the lifting column housing, respectively enters into engagement. Subsequently, the locking blocks 160,161 are inserted and pressed into the openings 158,159 in a locked position. Thus, the lifting column housing 153 is pushed against the bottom 162 and end wall 163 of the base unit, by which the lifting column 152 is fixed in the base unit 145.

Figure 35:
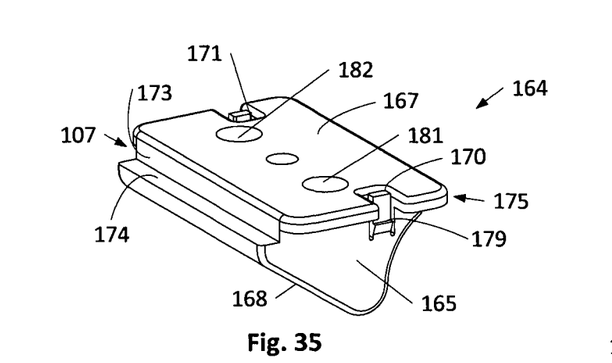
FIGS. 35-37 are a perspective view of an embodiment of the locking block shown from the side.
Figure 36:
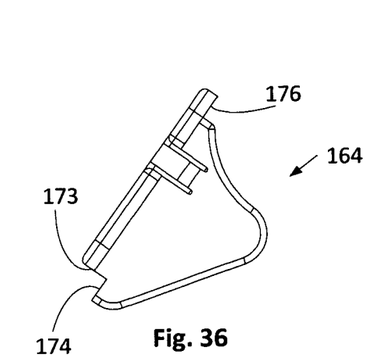
Figure 37:
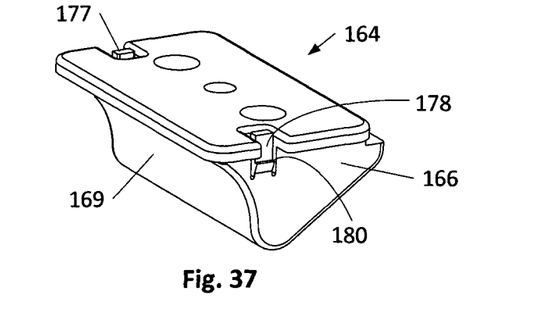

The construction and functions of the locking block are described in the following with reference to FIGS. 35-37, where the locking block is referenced 164. The locking block 164 is in all essentials wedge-shaped with two sides 165,166, a top surface 167, a first end surface, a rear surface 168 and a second end surface, front surface 169.

The top surface 167 comprises a recess 170,171 at each of the two sides 165,166. At the transition from the top surface 167 to the rear surface 168 the locking block comprises a projecting edge 172. The projecting edge 172 comprises a vertical surface 173 for engagement with a side surface in the opening in which the locking block is to be fixed. The projecting edge 172 further comprises a horizontal surface 174 for engagement against the underside of the unit (clamp or base unit) in which the locking block 164 is fixed. The top surface 167 extends with a collar 175 over the two sides 165,166 and the front surface 169. The underside 176 of the collar 175 is intended for engagement against the upper side of the unit (clamp or base unit) in which the locking block is fixed.

The transition from the underside 176 of the collar 175 to the two sides 165,166 of the locking block and the front surface 169 is approximately perpendicular to the top surface 167. After the transition the front surface 169 has a concave course, after which it runs convex in the transition to the rear surface 168. From this transition the rear surface 168 has a straight course, which finally is rounded off in the transition to the projecting edge 172.

Each of the two recesses 170,171 in the sides 165,166 is furnished with a snap lock, constructed as flaps 177,178 which in a resting position extend in a direction perpendicular to the top surface 167. The flaps 177,178 are secured to the bottom of the recesses 170,171, which partially enclose the flaps 177,178. The free space between the recesses 170,171 and the flaps 177,178 enables the flaps 177,178 to tilt in a direction perpendicular to the two sides 165,166 of the locking block.

Each of the flaps 177,178 of the snap lock comprises a collar with a projecting edge 179,180, which has a surface parallel to the top surface 167, prepared for engagement against the underside of the unit (clamp or base unit) in which the locking block is fixed.

For bringing the locking block 164 into a locked position the locking block 164 is inserted into an opening in a clamp or a base unit such that the projecting edge 172 is in engagement with a rear edge in the opening. Further, the concave transition from the front surface 169 to the rear surface 168 of the locking block 164 rests on the front end of the lifting column housing. By applying a force on the top surface 167 the locking block 164 is in a rotatable manner pressed into the opening; it rotates around the rear edge in the opening. Further, the lifting column housing is pushed in a direction away from the locking block 164, as the contact between the front surface 169 of the locking block and the front end of the lifting column housing gradually changes from a line of action to a plane of action.

As the underside of the collar 175 abuts the upper side of the unit (clamp or base unit) in which the locking block is fixed, the flaps 177,178 of the snap locks are tilted backwards in a direction towards each other and returns to their resting position when the projecting edges 179,180 engages the underside of the unit (clamp or base unit) in which the locking block is fixed. The locking block 164 is thus wedged in the unit as a result of: the engagement between the horizontal surface 174 of the projecting edge 172 and the underside of the unit, the engagement in the plane of action between the front surface 169 of the locking block and the front end of the lifting column housing, and the engagement between the projecting edges 179,180 and the underside of the unit. Thus, the locking block 164 is in its locked position.

The locking block 164 can be brought out of its locked position by tilting the flaps 177,178 of the snap lock backwards in a direction towards each other and bring the front surface 169 of the locking block out of engagement with the front end of the lifting column housing. The latter is expediently done by inserting a screw driver or the like into one of the holes 181,182 in the top surface 167.

It is understood that the elements or principles of each of the five embodiments can be combined in consideration of the specific application of the supporting frame. The invention is here particularly mentioned in connection with height-adjustable tables, but it is understood that the invention can also be used in connection with other types of furniture. It is further noted that even though the invention initially is intended for mounting of electrically driven lifting columns it is obvious that the invention can also be used for mounting of manually adjustable lifting columns as long as there is a housing at the upper end thereof.

The invention claimed is:

1. Supporting frame for a piece of furniture comprising a lifting column with telescopically arranged lower and upper profiles, and where each of the telescopically arranged profiles has an upper end and a lower end, and where said upper end of the upper profile has a housing secured thereto,
   a base unit with a compartment at least for partial reception of the lifting column housing, wherein the base unit comprises a guide,
   a clamp with guides for cooperation with the guide on the base unit, and wherein the housing of the lifting column is positioned between the base unit and the clamp, and
   a locking block mounted in the clamp and moveable between an unlocked position and a locked position in which the locking block is retained, which when placed in a locked position exerts a squeezing force between the base unit and the housing of the lifting column, wherein the locking block when placed in the locked position in cooperation with the base unit and the clamp exerts a squeezing force on the housing of the lifting column, by which the lifting column housing is fixed in the base unit.

2. Supporting frame according to claim 1, where the clamp comprises an opening into which the locking block can be inserted and retained when the locking block is in the locked position.

3. Supporting frame according to claim 1, wherein the base unit has a U-shaped cross section with two parallel side walls having a mutual distance corresponding to the width of the lifting column housing, and where the guide of the base unit is located on or constructed in the parallel side walls.

4. Supporting frame according to claim 3, wherein the base unit comprises a transverse wall, which connects the two parallel side walls, and where the housing of the lifting column with a rear end rests against the transverse wall.

5. Supporting frame according to claim 4, wherein the transverse wall of the base unit and the end of the lifting column housing, which rests against the transverse wall, are equipped with mutually cooperating means for retaining the housing of the lifting column in the base unit.

6. Supporting frame according to claim 5, further comprising a cross member and where the transverse wall constitutes part of the cross member.

7. Supporting frame according to claim 1, wherein the clamp has a U-shaped cross section with two parallel side walls, and where the guides of the clamp are located on the parallel side walls.

8. Supporting frame according to claim 1, wherein the cross section of the base unit is shaped like a hollow profile in which the housing of the lifting column can be arranged.

9. Supporting frame according to claim 8, wherein the hollow profile of the base unit comprises a recess for the telescopically arranged profiles of the lifting column, by which the entire housing of the lifting column can be received in the hollow profile of the base unit.

10. Supporting frame according to claim 9, wherein the hollow profile of the base unit comprises a opening in which the locking block can be inserted and retained when the locking block is in the locked position.

11. Supporting frame according to claim 9, further comprising a transverse wall, which at least partially closes one end of the hollow profile of the base unit, and where the housing of the lifting column with an end wall can rest against the transverse wall.

12. Supporting frame according to claim 1, wherein the housing of the lifting column comprises a guide for cooperation with the guide on the base unit.

13. Supporting frame according to claim 12, wherein the base unit comprises an opening into which the locking block can be inserted and retained when the locking block is in the locked position.

14. Supporting frame according to claim 1, wherein the locking block comprises a front surface for engagement with the housing of the lifting column.

15. Supporting frame according to claim 1, wherein the locking block comprises a projecting edge for engagement with an edge of the opening, around which engagement the locking block in a rotatable manner can be pressed into the opening.

16. Supporting frame according to claim 1, wherein the lifting column is of the type, where an electric motor and a transmission for bringing about the movement of the lifting column is arranged in the housing of the lifting column.

17. Supporting frame according to claim 1, wherein the lifting column is of the type, where an electric motor and a transmission for bringing about the movement of the lifting column is arranged in one of the telescopically arranged profiles and where the housing as a separate unit is mounted on one end of one of the telescopically arranged profiles.

18. Supporting frame according to claim 1, wherein the locking block is pivotable between the locked position and the unlocked position.

19. Supporting frame for a piece of furniture comprising:
- a lifting column with telescopically arranged lower and upper profiles, and where each of the telescopically arranged profiles has an upper end and a lower end, and where said upper end of the upper profile has a housing secured thereto,
- a base unit with a compartment at least for partial reception of the lifting column housing, wherein the base unit comprises a guide,
- a locking element, which when placed in a locked position exerts a squeezing force between the base unit and the housing of the lifting column, by which the lifting column housing is fixed in the base unit, and where the locking element comprises means for retaining the locking element in the locked position, and
- a clamp with guides for cooperation with the guide on the base unit, wherein the locking element is mounted in the clamp and where the housing of the lifting column is positioned between the base unit and the clamp, and where the locking element when placed in the locked position in cooperation with the base unit and the clamp exerts a squeezing force on the housing of the lifting column, by which the housing of the lifting column is fixed in the base unit.

* * * * *